US012266022B2

(12) United States Patent
Laserson

(10) Patent No.: US 12,266,022 B2
(45) Date of Patent: Apr. 1, 2025

(54) DATA-DRIVEN VALUABLE MEDIA BALANCE OPTIMIZATION PROCESSING

(71) Applicant: NCR Voyix Corporation, Atlanta, GA (US)

(72) Inventor: Itamar David Laserson, Givat Shmuel (IL)

(73) Assignee: NCR Voyix Corporation, Atlanta, GA (US)

( * ) Notice: Subject to any disclaimer, the term of this patent is extended or adjusted under 35 U.S.C. 154(b) by 846 days.

(21) Appl. No.: 17/208,017

(22) Filed: Mar. 22, 2021

(65) Prior Publication Data

US 2022/0301077 A1  Sep. 22, 2022

(51) Int. Cl.
*G06Q 40/12*  (2023.01)
*G06N 20/00*  (2019.01)
*G07D 11/36*  (2019.01)

(52) U.S. Cl.
CPC ........... *G06Q 40/125* (2013.12); *G06N 20/00* (2019.01); *G07D 11/36* (2019.01)

(58) Field of Classification Search
CPC ....... G06Q 40/125; G06N 20/00; G07D 11/36
See application file for complete search history.

(56) References Cited

U.S. PATENT DOCUMENTS

| 8,131,577 | B2* | 3/2012 | Lessing | G06Q 30/02 |
| | | | | 705/7.11 |
| 10,204,380 | B1* | 2/2019 | Moore | G06F 16/353 |
| 11,023,909 | B1* | 6/2021 | Badger | G06Q 30/0255 |
| 11,507,892 | B1* | 11/2022 | Henckel | G06Q 30/0631 |
| 2011/0054987 | A1* | 3/2011 | Nicolas | G06Q 50/01 |
| | | | | 705/14.13 |
| 2016/0162860 | A1* | 6/2016 | Gonzalez | G06Q 20/203 |
| | | | | 705/16 |
| 2018/0082229 | A1* | 3/2018 | Fu | G06Q 30/02 |
| 2018/0101907 | A1* | 4/2018 | Yamashita | G06F 16/23 |
| 2021/0150427 | A1* | 5/2021 | Porth | G06Q 30/0201 |
| 2022/0092702 | A1* | 3/2022 | Rapsey | G06Q 40/125 |

* cited by examiner

*Primary Examiner* — Michael Jared Walker
(74) *Attorney, Agent, or Firm* — Schwegman Lundberg & Woessner, P.A.

(57) ABSTRACT

Valuable media balancing data and transaction data for valuable media accounts are tagged into categories and a machine-learning model is derived by training the model with the data and actual actions taken to rectify account discrepancies. The model is provided real-time data and produces as output a probability that a given account can have a discrepancy rectified along with recommended actions for resolving the discrepancy and specific transactions that should be investigated with the actions. If different actions are taken to resolve the discrepancy and/or if different transactions were identified as a cause of the discrepancy, the different actions and different transactions are provided as feedback to the model for subsequent training sessions of the model.

6 Claims, 3 Drawing Sheets

DATA-DRIVEN VALUABLE MEDIA BALANCE OPTIMIZATION PROCESSING

BACKGROUND

A typical second-tier retailer spends approximately $850,000 work hours per year on cash office balancing and they are still losing approximately $4.4 million on cash shortages. Cash office balancing is typically done at the stores' end of day to hold employees accountable for the cash in their account.

Cash balancing is a necessary procedure for businesses that accept cash throughout the day, which is nearly every brick-and-mortar store, such as grocery stores, restaurants, appliance/furniture/electronic retailers, etc. The procedure takes place and the end of a business day or at the end of a given cashier's shift. It makes the cashier/store manager accountable for the money collected in their cash registers or store safes.

A typical cash balancing procedure proceeds as follows: 1) safe cash counts or register cash counts are performed, 2) any overages or shortages between totals maintained by receipts and the counts are reviewed, 3) balanced accounts are approved for settlement, 4) investigations are made into unbalanced accounts, and 5) the business period is settled and the collected information is stored in the retailer's financial systems.

Investigation of unbalanced accounts is costly in terms of time as it requires manually drilling into dozens or even hundreds of cash activities that were recorded throughout the day. In most cases, the causes of discrepancies are rooted in human mistakes, miscounts, and/or poor operational procedures. Less common cases for the discrepancies are rooted in technical failures, employee fraud, or customer theft.

The negative impacts of the discrepancies are significant. A typical retailer may not even spend time to investigate a shortage lower that approximately $20, some retailers even increase that threshold to approximately $50. Conservatively, if a total shortage per store and per day of a second-tier retailer reaches $40, then the total loss can reach approximately $4.4 million annually for the retailer. Additionally, retailers are spending time and expense trying to identify the root cause of cash balancing overages and shortages if the discrepancies are greater than an expected threshold.

Additionally, shortages are subject to audits which may result in additional overhead expense for the retailer.

As a result, retailers continue to struggle with optimizing cash management and reducing cash balancing shortages to a minimum while also reducing labor costs associated with cash balance investigations.

SUMMARY

In various embodiments, methods and a system for data-driven valuable media balance optimization processing are presented.

According to an aspect, a method data-driven valuable media balance optimization is presented. For example, transaction data for a valuable media account that is associated with a discrepancy during a valuable media balancing operation on the valuable media account is received. A probability is determined as to whether the discrepancy should be investigated and actions to take on one or more transactions of the transaction data for resolving the discrepancy are determined. The probability, the actions, and the one or more transactions are provided for resolution of the valuable media balancing operation.

DETAILED DESCRIPTION

Figure 1:
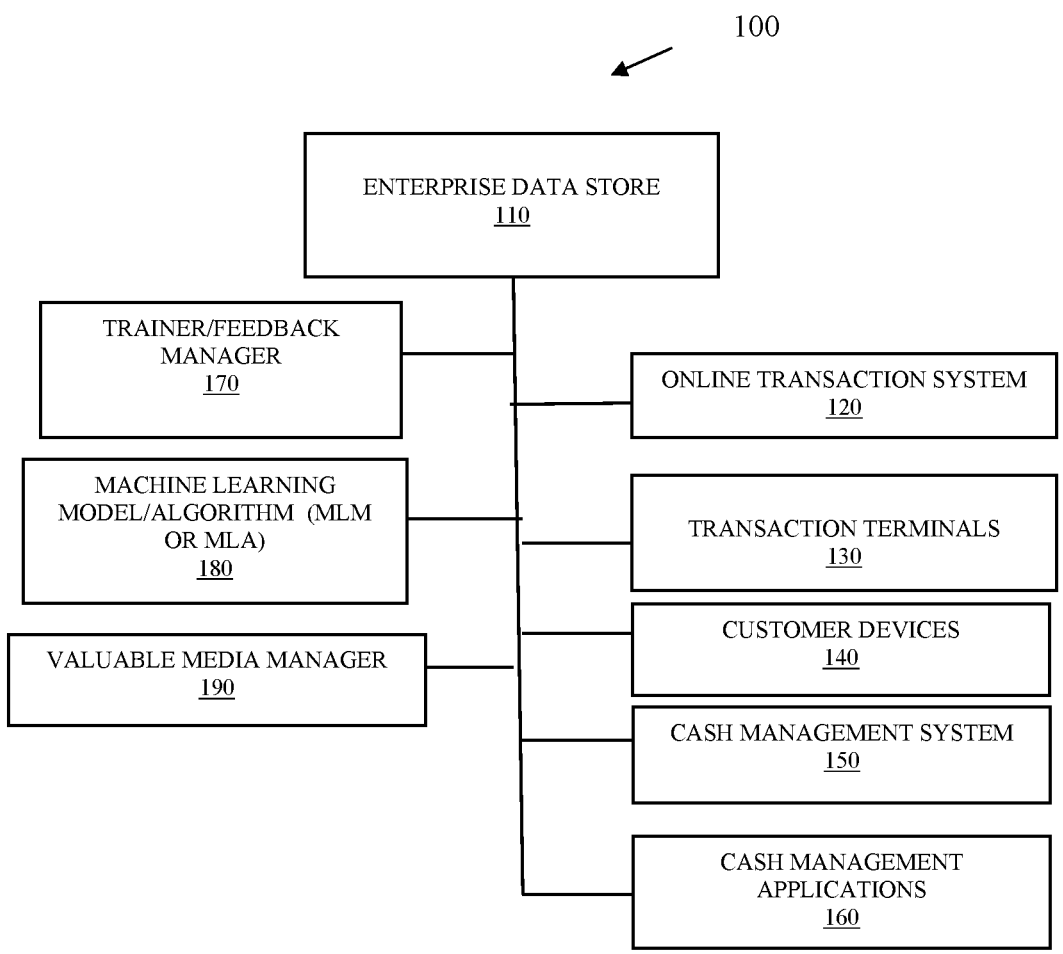
FIG. 1 is a diagram of a system for data-driven valuable media balance optimization, according to an example embodiment.

FIG. 1 is a diagram of a system 100 for data-driven valuable media balance optimization, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of data-driven valuable media balance optimization presented herein and below.

The system 100 provides a mechanism by which collection of data relevant to unbalanced cash office accounts are modeled to provide a variety of prediction-based and investigation-based features. The modeled data is labeled or tagged based on transaction data associated with transactions and stored in an enterprise's data store. A trained machine-learning (ML) model is derived based on the tagged unbalanced accounts from the data store to output a likelihood (probability) associated with each unbalanced account as to whether it can be resolved along with a set of recommendations as to the specific transactions, which may be the root cause of the discrepancy for correction. Moreover, the ML model includes a feedback mechanism to collect actual responses or outcomes to the model's predictions/recommendations, which are used during training sessions to continuously train the model for continuous learning and improved accuracy in predictions and recommendations. Furthermore, the system 100 is provided as a service to enterprise-based applications through a user-facing interface and/or an Application Programming Interface (API).

The system 100 reduces the amount of staff time required by an enterprise to perform cash balancing operations by identifying only those accounts with discrepancies that are most likely to be resolved, so accounts that are not worth investigation are filtered out. Additionally, only the specific transactions with the highest likelihood of resolving the discrepancies are identified by system 100, such that staff are specifically directed to those transactions when investigating discrepancies. System 100 will also make it easier to identify a root cause for more cases of account discrepancies, which enables the enterprise to identify operational fail points as well as detect cases of employee theft.

As used herein "valuable media" is intended to include cash, government-backed currency, virtual currency, checks, coupons, and/or enterprise tokens for which an enterprise assigns a currency value to.

For purposes of the discussion that follows, the valuable media balance optimization processing techniques are discussed within the context of cash or government-backed currency; however, it is noted that valuable media may also include virtual currency, checks, coupons, and/or enterprise tokens. Moreover, although the balance optimization processing techniques are discussed from the perspective of cash-based procedures, it is noted that other procedures associated with virtual currency digital wallets, checks, coupons, and/or enterprise tokens may be used for balancing non-cash or non-government backed currency accounts.

Furthermore, an "account" is intended to mean a unique trackable identifier for a record or set of data that is associated with a managing, receiving, and/or dispensing valuable media; thus, a given account is uniquely associated with an asset or a resource that handles, stores, transports, dispenses, and collects valuable media, such as a cash drawer, a safe, a currency cassette, a cashier, a cash officer of the enterprise, a terminal, a digital wallet, etc. Accounts can be arranged in hierarchical relationships, for example several cashier accounts or cash drawer accounts can be assigned under a single terminal account, multiple terminal accounts can be assigned to a single store account, several store accounts can be arranged under a single retailer region account, serval region accounts can be arranged under a single retailer account, etc.

System 100 comprises a variety of hardware computing devices, such as servers, terminals, desktops, mobile devices, laptops, and/or a cloud (comprising a plurality of servers logically cooperating and accessible as a single server). Each device comprises one or more processors and a non-transitory computer-readable storage medium. Each medium comprises executable instructions for one or more software modules, applications, or services. Each processor when provided the executable instructions performs operations discussed herein and below for 110-190.

The pertinent components of system 100 are illustrated in FIG. 1 as online transaction system 120, transaction terminals 130, customer-operated devices 140, cash management system 150, cash management applications, trainer/feedback manager 170, machine-learning module (MLM) or machine-learning algorithm (MLA) 180, and valuable media manager 190.

Components 110-120 are operated on retailer/enterprise hardware computing devices or operated on behalf of the retailer/enterprise from a cloud or an external server (external to the retailer/enterprise). Components 170-190 are provided as a server-based or cloud-based service to the retailer/enterprise accessible through a user-facing interface provided to cash management applications 160 and/or cash management system 150 and/or through an API provided to cash management system 150 and/or cash management applications 160.

Enterprise data store 110 includes a variety of enterprise data, such as transaction histories (along with transaction details, such as price, type of valuable media used, items purchased (item codes and item descriptions), customer identifier, transaction operator identifier, terminal or device identifiers, date and time stamps, etc.) for transactions performed with a retailer. Other types of data may be included in enterprise data store 100 as well or linked from the enterprise data store 110 to other data stores, such as a Customer Relationship Management (CRM) or loyalty data store and item product catalogue. The linked data can include such information as incentives (promotions) provided to customers of the enterprise, customer data for known customers (loyalty data, profile data, etc.), item or product catalogue data, and other information captured and retained by the enterprise for the store and other stores associated with the enterprise (retailer). Enterprise data store 110 also includes transaction logs captured by online transaction system 120, transaction terminals 130, and/or customer-operated devices that perform transactions with the retailer/enterprise. The logs may include identifiers for the online transaction system 120, transaction terminals 130, customer devices, the transactions, and the operators of the transactions (customer identifiers for self-checkouts performed by a customer, cashier identifiers for cashiers performing assisted checkouts on behalf of the customers).

Online transaction system 120 comprises interfaces and corresponding software by which customers perform online transactions with a retailer, such as via browsing items, storing selected items in a virtual cart, and checking out (paying for) items in the virtual cart. The online transaction system 120 can be web-based and/or mobile app-based. Virtual cart data provided in real time from online transaction system 120 to enterprise data store 110.

Transaction terminals 130 comprise peripheral devices (scanners, printers, media acceptors/dispensers, weigh scales, Personal Identification Number (PIN) pads, card readers, etc.) and corresponding software for performing customer checkouts associated with transactions. Real-time item and transaction data provided by terminals to enterprise data store 110.

User devices 140 comprise peripherals (touchscreens, cameras, etc.) and corresponding software for performing customer transactions using a web browser or a mobile application (app). Real time transaction data provided by any app to enterprise data store 110.

Cash management system 150 comprises software applications and interfaces of the enterprise for tracking, managing, auditing, forecasting, reporting, balancing, and adjusting accounts linked to the valuable media assets or resources of the enterprise.

Cash management applications 160 comprise software and interfaces for performing and recording cash balancing workflows and operations on the accounts at defined intervals or time or based on predefined events (such as a change of shift by a cashier, unexpected end of a shift from one cashier to a new cashier, terminal failure, closure of a store at the end of a business day as planned, closure of the store because of an unforeseen event, etc.).

Cash management applications 160 provide workflows and interfaces for staff to count cash present within a safe, a cash drawer, a terminal, a cassette, etc.; the counts entered into the interface by the staff members (including any members required to verify the staff member's count) are then compared against terminal-calculated cash counts that are supposed to be present based on transaction receipts and logs for the terminal at a designated time when the cash balancing operation is being performed in accordance with a designated workflow. For example, at the end of a shift when a first cashier ends a shift, the cash present in the cash drawer is counted by the first cashier and verified by another authorized staff member, during the shift customers paid for transactions in cash, which the first cashier put into the cash drawer and provided any needed change back to the customers. Also, during the shift, the cashier may have been short on $1 bills and a manager delivered a stack of 50 $1 bills to the cashier and the cashier exchanged out 2 $20 bills and 1 $10 bill to the manager to account for the received 50 $1 bills. Each denomination in the cash drawer and change is counted at the end of the shift by the first cashier and the totals per denomination are entered into the cash management system for an account associated with the first cashier, the cash drawer, and/or the terminal. At the end of the day, the accounts are balanced to identify discrepancies (overages from what is expected based on the transaction log for the terminal or shortages from what is expected based on the transaction log).

The cash management application 160 provide an interface for recording a variety of cash-based verification processes. Some of these processes include data recording: 1) journal data specifying which cash office account were investigated (queried) by which users and for how long; 2) cash office transaction that were recorded after the business day was finalized (this is a good indication as to transactions that were performed after the fact as part of a balancing process as opposed to regular business day activities, such transaction are typically performed as a result of an investigation aimed at detecting and correcting discrepancies; 3) cash office transaction adjustments (actions permitted only by cash officers or other employees with appropriate security authorization), such transaction are typically performed as a result of an investigation aimed at detecting and correcting discrepancies; 4) cash office accounts (declarations) when these are performed more than once per account after the end of a business period it is an indication of an action meant to address discrepancies; 5) reason codes or free text manually keyed by a cash officer when approving account discrepancies.

Valuable media manager 190 performs unique processing on the cash office accounts. For example, for data relevant to cash office declarations (4), manager 190 categories historical records relevant to (4) for a given business period into A) untouched categories, B) unresolved categories, and resolved categories.

Untouched (A) categories represent unbalanced accounts for which no investigation or adjustments were made after the end of the corresponding business period. These categories would typically represent accounts with small discrepancies for which the retailer chose not to perform any investigation to rectify and balance.

Unresolved (B) categories also represent unbalanced accounts for which the logs showed there was a significant effort made to investigate the discrepancies, yet there were no monetary corrective actions taken by the cash office team to correct these accounts. The effort taken is identified as queries taken to review transaction on the specific accounts after the end of the corresponding business period by a user that has a security role of a cash officer.

Resolved (C) categories represent unbalanced accounts for which monetary actions were taken to reduce the discrepancies. For example, a cash office adjustment on a certain cash office fund transfer transaction or on a cash count (declaration) that was taken to amend a previously recorded cash count.

Manager 190 tags the accounts in the cash balancing history records as for untouched categories and unresolved categories based on the reason code provided by the user after an approval was given for the corresponding discrepancy. Furthermore, manager 190 tags accounts in the cash balancing history records for resolved categories based on the actions taken by the user to reduce the corresponding discrepancies.

The tagged cash balancing history records from the enterprise data store 110 are then processed by trainer/feedback manager 170 to train and develop MLM 180. The features or input (X parameters) provided during training by trainer/feedback manager 170 to MLM 180 comprises the tagged cash balancing history records, cashier identifiers for the accounts, transaction details for the transactions associated with the corresponding account, transaction types for the transactions, transaction amounts for the transactions, and the amounts of discrepancies. The expected output during the training session from the MLM 180 is also provided by trainer/feedback manager 170 to the MLM 180 as Y parameters (this is the actual outcome that the MLM 180 uses to derive the model/algorithm to produce as output following the training session. The Y parameters are those portions of the tagged records that include the corresponding monetary actions taken to correct the corresponding discrepancies (if any, since untouched categories would include no monetary actions taken) and the corresponding reason codes or text explanation provided by the user as any approval reason for approving the corresponding discrepancies.

The historical tagged cash balancing history records and the corresponding transaction data along with the monetary actions and reason codes as expected results used during the training session results in a trained MLM 180, which when provided account identifiers and the corresponding data for the accounts and their transaction data produces as output a probability for all unbalanced accounts along with monetary actions that can be processed to balance or rectify the unbalanced accounts.

Manager 190 uses predefined threshold probabilities to compare against an outputted probability from a trained MLM 180 to present a certainty level score to a cash office manager of a given enterprise for all unbalanced accounts at the end of a designated business period. The cash balancing team of the enterprise then focuses their efforts on investigating unbalanced accounts flagged with a level of certainty that the discrepancies can be resolved, and they would perform the recommended monetary actions provided as output from the MLM 180 for the corresponding accounts. The recommendations may also identify specific types of transactions for which require investigation, the MLM 180 uses the training monetary actions and corresponding transactions to provide this level of detail in the recommendations, such that the recommended monetary actions may also specifically identify transactions associated with the account allowing the teach to directly focus on the potential root cause of a given discrepancy in a given account when performing cash balancing operations at the end of a given period. For example, a specific cash transaction can be provided as output with the recommendations that is a root cause of a given account's discrepancy.

Once the cash office manager and the cash balancing team resolve a given account and its discrepancy, if the monetary actions and corresponding transactions associated with the account are different from what was recommended by the MLM 180, then the monetary actions and corresponding transactions along with the cash balancing record for the given account are used as feedback to the MLM 180 during a subsequent training session. This allows the MLM 180 to continuously learn and become more accurate in identifying accounts that can and should be rectified and become more accurate in proposing the needed monetary actions and transactions to investigate when rectifying the discrepancies. This creates a continuous feedback loop between actual monetary actions and problematic transactions for a given account during a cash balancing procedure for a given business period that were taken to resolve a given discrepancy and the training of MLM 180 to continuously improve its accuracy.

Valuable media manager 190 also includes a front-end interface for interaction with cash management applications 160 and cash management system 150 for purposes of obtaining cash balancing records and transaction data from enterprise data store 110 for a given account and providing the probability that a discrepancy can be resolved along with recommendations for monetary actions and specific transactions that should be investigated to rectify the discrepancy. An API may also be provided such that automated applications can interact with manager 190 to receive the probabilities and recommendations. The interface and API may also be used to provide feedback of actual monetary actions and transactions investigated to rectify a given discrepancy for a given account by the cash balancing team for purposes of providing feedback that manager 190 retains for subsequent training sessions of MLM 180 by trainer 170.

In an embodiment, the transaction terminals 130 comprise Self-Service Terminals (SSTs), Point-Of-Sale (POS) terminals, Automated Teller Machines (ATMs), and kiosks.

These and other embodiments are now discussed with reference to the FIGS. 2-3.

Figure 2:
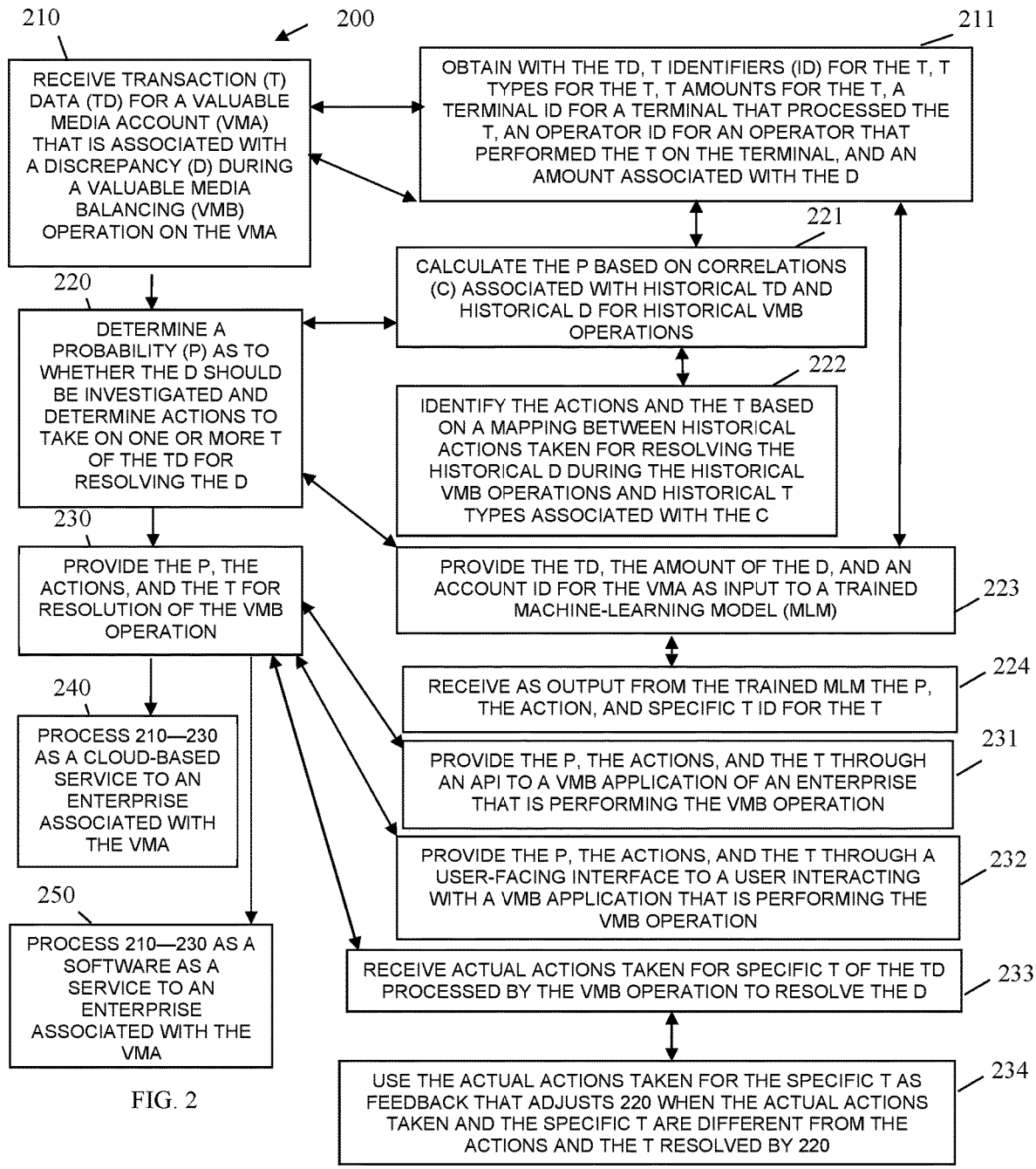
FIG. 2 is a diagram of a method for data-driven valuable media balance optimization, according to an example embodiment.

FIG. 2 is a diagram of a method 200 for data-driven valuable media balance optimization, according to an example embodiment. The software module(s) that implements the method 200 is referred to as a "valuable media balancing manager." The valuable media balancing manager is implemented as executable instructions programmed and residing within memory and/or a non-transitory computer-readable (processor-readable) storage medium and executed by one or more processors of a device. The processor(s) of the device that executes the valuable media balancing manager are specifically configured and programmed to process the valuable media balancing manager. The valuable media balancing manager has access to one or more network connections during its processing. The network connections can be wired, wireless, or a combination of wired and wireless.

In an embodiment, the device that executes the valuable media balancing manager is a server. In an embodiment, the server is a cloud processing environment that comprises multiple servers cooperating with one another as a single server. In an embodiment, the server is a Local Area Network (LAN) server.

In an embodiment, the valuable media balancing manager is all of or some combination of 170-190.

In an embodiment, the valuable media balancing manager performs the processing discussed above with system 100 for purposes of identifying unbalanced valuable media accounts that are predicted to be capable of having discrepancies resolved along with recommended monetary actions to resolve the discrepancies and specific transactions to investigate for rectifying the discrepancies.

In an embodiment, the valuable media balancing manager is provided as a SaaS (Software-as-a-Service) to a plurality of enterprises, each enterprise having a subscription relevant to its valuable media accounts and enterprise data store 110.

At 210, the valuable media balancing manager receives transaction data for a valuable media account that is associated with a discrepancy during a valuable media balancing operation on the valuable media account.

In an embodiment, at 211, the valuable media balancing manager obtains with the transaction data, transaction identifiers for transactions of the transaction data, transaction types for the transactions, a terminal identifier for a terminal that processed the transaction, an operator identifier for an operator that performed the transaction on the terminal, and an amount associated with the discrepancy.

At 220, the valuable media balancing manager determines a probability as to whether the discrepancy should be investigated and determines actions to take on one or more transactions of the transaction data for resolving or for mitigating the discrepancy.

In an embodiment of 211 and 220, at 221, the valuable media balancing manager calculates the probability based on correlations associated with historical transaction data and historical discrepancies for historical valuable media balancing operations. That is, the historical valuable media cash balancing records and transaction data are correlated statistically for purposes of calculating the probability.

In an embodiment of 221 and at 222, the valuable media balancing manager identifies the actions and the one or more transactions based on a mapping between historical actions taken for resolving the historical discrepancies during the historical valuable media balancing operations and historical transaction types associated with the correlations.

In an embodiment of 211 and 220, at 223, the valuable media balancing manager provides the transaction data, the amount of the discrepancy, and an account identifier for the valuable media account to a trained MLM.

In an embodiment of 223 and at 224, the valuable media balancing manager receives as output from the trained MLM the probability, the action, and specific transaction identifiers for the one or more transactions.

At 230, the valuable media balancing manager provides the probability, the actions, and the one or more transaction for resolution of the valuable media balancing operation.

In an embodiment, at 231, the valuable media balancing manager provides the probability, the actions, and the one or more transactions through an API to a valuable media balancing application for an enterprise that is performing the valuable media balancing operation. In an embodiment, the valuable media balancing application is cash management application 160 or an application of cash management system 150.

In an embodiment, at 232, the valuable media balancing manager provides the probability, the actions, and the one or more transactions through a user-facing interface to a user interacting with a valuable media balancing application that is performing the valuable media balancing operation.

In an embodiment, at 233, the valuable media balancing manager receives actual actions taken for specific transactions of the transaction data processed by the valuable media balancing operation to resolve the discrepancy.

In an embodiment of 233 and at 234, the valuable media balancing manager uses the actual actions taken for the specific transactions as feedback that adjusts the determining at 220 when the actual actions taken and the specific transactions are different from the actions and the one or more transaction resolved by the valuable media balancing manager at 220.

In an embodiment, at 240, the valuable media balancing manager processes as a cloud-based service to an enterprise associated with the valuable media account.

In an embodiment, at 250, the valuable media balancing manager processes as a SaaS to an enterprise associated with the valuable media account.

Figure 3:
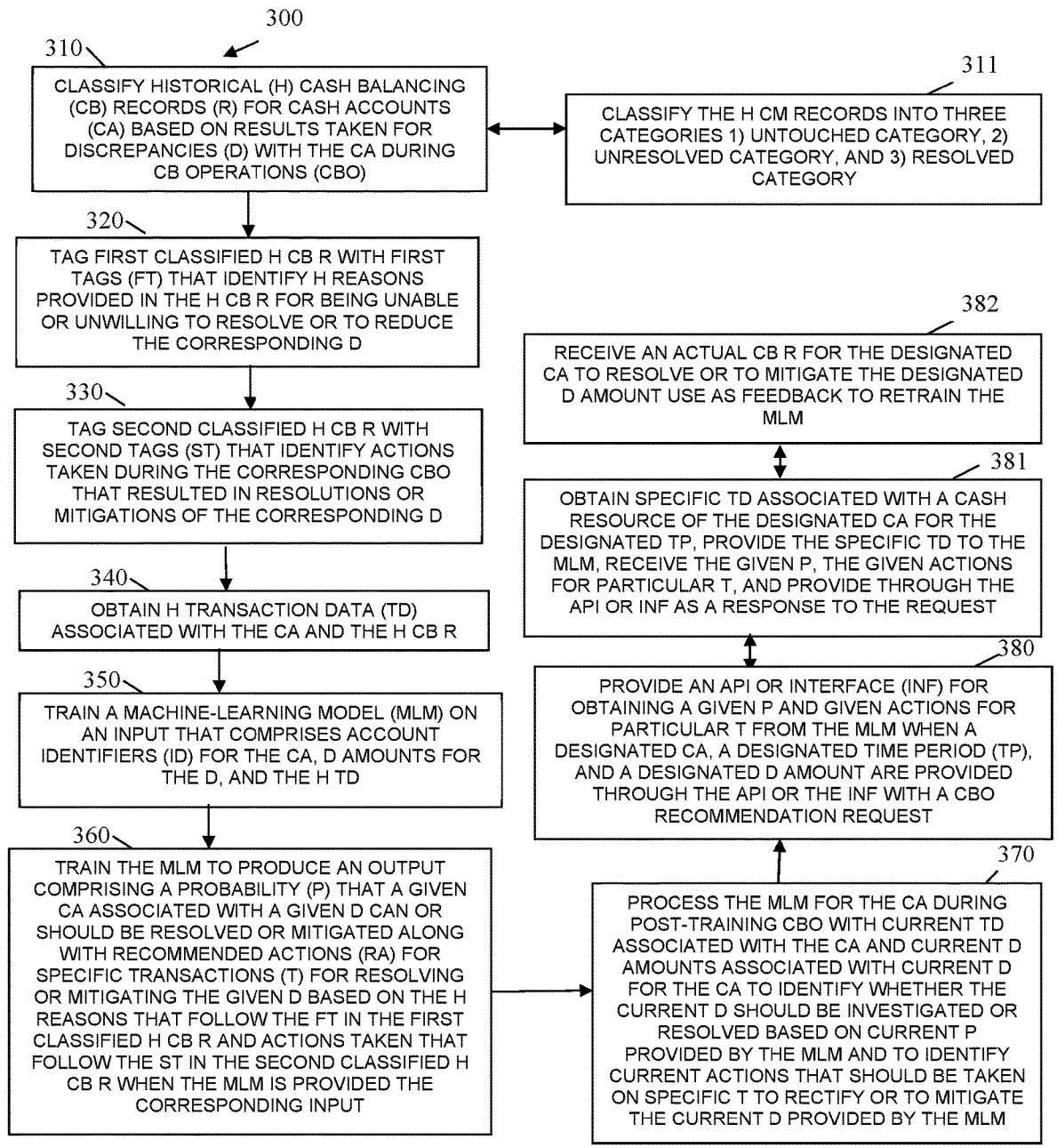
FIG. 3 is a diagram of another method for data-driven valuable media balance optimization, according to an example embodiment.

FIG. 3 is a diagram of another method 300 for data-driven valuable media balance optimization, according to an example embodiment. The software module(s) that implements the method 300 is referred to as a "cash account discrepancy predictor and recommender." The cash account discrepancy predictor and recommender is implemented as executable instructions programmed and residing within memory and/or a non-transitory computer-readable (processor-readable) storage medium and executed by one or more processors of a device. The processors that execute the cash account discrepancy predictor and recommender are specifically configured and programmed to process the cash account discrepancy predictor and recommender. The cash account discrepancy predictor and recommender has access to one or more network connections during its processing. The network connections can be wired, wireless, or a combination of wired and wireless.

In an embodiment, the device that executes the cash account discrepancy predictor and recommender is a server. In an embodiment, the server is a cloud processing environment that comprises multiple servers cooperating with one another as a single logical server. In an embodiment, the server is a LAN server that is local to a retail store.

In an embodiment, the cash account discrepancy predictor and recommender is all or some combination of 170-190 and/or the method 200.

The cash account discrepancy predictor and recommender presents another and, in some ways, enhanced processing perspective to that which was described above with the FIG. 2.

At 310, the cash account discrepancy predictor and recommender classifies historical cash balancing records for cash accounts based on results taken for discrepancies with the cash accounts during cash balancing operations.

In an embodiment, at the 320, the cash account discrepancy predictor and recommender classifies the historical cash balancing records into three categories. The three categories comprise an 1) an untouched category indicating that no no investigations or adjustments were made to the corresponding discrepancies for the corresponding cash accounts; 2) an unresolved category indicating attempts were made to mitigate or to resolve the corresponding discrepancies for the corresponding cash accounts but the attempts were unsuccessful; and 3) a resolved category indicating that specified actions were successful in mitigating or resolving the corresponding discrepancies for the corresponding cash accounts.

At 320, the cash account discrepancy predictor and recommender tags first classified historical cash balancing records with first tags that identify historical reasons provided in the historical cash balancing records for being unable or unwilling to resolve or to reduce the corresponding discrepancies.

At 330, the cash account discrepancy predictor and recommender tags second classified historical cash balancing records with second tags that identify actions taken during the corresponding cash balancing operations that resulted in resolutions or mitigations of the corresponding discrepancies.

At 340, the cash account discrepancy predictor and recommender obtains historical transaction data associated with the cash accounts and the historical cash balancing records.

At 350, the cash account discrepancy predictor and recommender trains a MLM on an input that comprises account identifiers for the cash accounts, discrepancy amounts for the discrepancies, and the historical transaction data.

At 360, the cash account discrepancy predictor and recommender trains the MLM to produce an output comprising a probability that a give cash account associated with a given discrepancy can or should be resolved or mitigated along with recommended actions for specific transaction for resolving or mitigating the given discrepancy based on the historical reasons that follow the first tags in the first classified historical cash balancing records and actions taken that follow the second tags in the second classified historical cash balancing records when the MLM is provided the corresponding input.

At 370, the cash account discrepancy predictor and recommender processes the MLM for the cash accounts during post-training cash balancing operations with current transaction data associated with the cash accounts and current discrepancy amounts associated with current discrepancies for the cash accounts to identify whether the current discrepancies should be investigated or resolved based on a current probability provided by the MLM and to identify current actions that should be taken on specific transactions to rectify or to mitigate the current discrepancies as provided by the MLM.

In an embodiment, at 380, the cash account discrepancy predictor and recommender provides an API or a user-facing interface for obtaining a given probability and given recommended actions for particular transactions from the MLM when a designated cash account, a designated time period, and a designated discrepancy amount are provided through the API or the user-facing interface with a cash balancing operation recommendation request.

In an embodiment of 380 and at 381, the cash account discrepancy predictor and recommender obtains specific transaction data associated with a cash resource (terminal, safe, cash drawer, cashier, currency cassette, etc.) of the designated cash account for the designated time period. The cash account discrepancy predictor and recommender provides the specific transaction data to the MLM, receives the given probability and the given actions for the particular transactions from the MLM as output, and provides the given probability and the given actions for the particular transaction through the API or the user-facing interface as a response to the cash balancing operation recommendation request.

In an embodiment of 381 and at 382, the cash account discrepancy predictor and recommender receives from the API or the user-facing interface an actual cash balancing record for the designated cash account comprising actual actions taken for the particular transactions on actual transactions associated with the specific transaction data that were performed to resolve or to mitigate the designated discrepancy amount in the designated cash account when the actual actions taken or the actual transactions are different from the given actions or the particular transactions provided by the machine-learning model as the response. Then, the cash account discrepancy predictor and recommender classifies the actual cash balancing record into a specific category for the designated cash account; tags the actual cash balancing record with the second tags for the actual actions taken; and retrains the MLM on the specific transaction data, the designated discrepancy amount, and a designated cash account identifier for the designated cash account with the actual actions following the second tags in the actual cash balancing record and provided as an expected recommended outputted from the MLM following the retraining.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    classifying historical cash balancing records for cash accounts into categories based on results taken for cash discrepancies with the cash accounts during cash balancing operations;
    tagging first classified historical cash balancing records with first tags that identify historical reasons provided in the historical cash balancing records for being unable or unwilling to resolve or to reduce corresponding discrepancies;
    tagging second classified historical cash balancing records with second tags that identify actions taken during corresponding cash balancing operations that resulted in resolutions or mitigations of corresponding discrepancies;
    obtaining historical transaction data associated with the cash accounts and the historical cash balancing records, wherein the historical transaction data includes transaction details such as price, type of valuable media used, items purchased, customer identifier, transaction operator identifier, terminal or device identifiers, date and time stamps;
    training a machine-learning model on an input that comprises account identifiers for the cash accounts, discrepancy amounts for the discrepancies, and the historical transaction data;
    training the machine-learning model to produce an output comprising a probability that a particular cash account with a particular discrepancy can or should be resolved or mitigated along with recommended actions for specific transactions for resolving or mitigating the particular discrepancy based on the historical reasons that follow the first tags in the first classified historical cash balancing records and the actions taken that follow the second tags in the second classified historical cash balancing records when the machine-learning model is provided corresponding input;
    processing the machine-learning model for the cash accounts during post-training cash balancing operations with current transaction data associated with the cash accounts and current discrepancy amounts associated with current discrepancies for the cash accounts to identify whether the current discrepancies should be investigated or resolved based on current probabilities provided by the machine-learning model and to identify current actions that should be taken on specific transactions to rectify or to mitigate the current discrepancies provided by the machine-learning model;
    receiving actual actions taken for specific transactions of the current transaction data processed by a valuable media balancing operation to resolve the current discrepancies; and
    using the actual actions taken for the specific transactions as feedback that adjusts determining when the actual actions taken and the specific transactions are different from the actions and the specific transactions resolved by determining, wherein the feedback is used to retrain the machine-learning model during a subsequent training session to continuously improve accuracy in identifying accounts that can and should be rectified and in proposing needed monetary actions and particular transactions to investigate when rectifying the discrepancies.

2. The method of claim 1 further comprising, providing an Application Programming Interface (API) or a user interface for obtaining a particular probability and particular actions for particular transactions from the machine-learning model when a designated cash account, a designated time period, and a designated discrepancy amount are provided through the API or provided through the user interface with a cash balancing operation recommendation request.

3. The method of claim 2, wherein providing further includes obtaining specific transaction data associated with a cash resource of the designated cash account for the designated time period, providing the specific transaction data to the machine-learning model, receiving the particular probability and the particular actions for the particular transactions, and providing the particular probability and the particular actions for the particular transactions through the API or through the user interface as a response to the cash balancing operation recommendation request.

4. The method of claim 3 further comprising, receiving from the API or receiving from the user interface an actual cash balancing record for the designated cash account comprising actual actions taken for the particular transactions on actual transactions associated with the specific transaction data that were performed to resolve or to mitigate the designated discrepancy amount in the designated cash account when the actual actions taken or the actual transactions are different from the particular actions or the particular transactions provided by the machine-learning model as the response.

5. The method of claim 4, wherein receiving further includes classifying the actual cash balancing record into a specific category for the designated cash account, tagging the actual cash balancing record with the second tags for the actual actions taken, and retraining the machine-learning model on the specific transaction data, the designated discrepancy amount, and a designated cash account identifier for the designated cash account with the actual actions following the second tags in the actual cash balancing record provided as an expected recommended outputted from the machine-learning model following retraining.

6. The method of claim 1, wherein classifying further includes classifying the historical cash balancing records into three categories, wherein the three categories comprise an 1) an untouched category indicating that no investigations or adjustments were made to the corresponding discrepancies for corresponding cash accounts, 2) an unresolved category indicating attempts were made to mitigate or to resolve the corresponding discrepancies for the corresponding cash accounts but the attempts were unsuccessful, and 3)

a resolved category indicating that specified actions were successful in mitigating or resolving the corresponding discrepancies for the corresponding cash accounts.

\* \* \* \* \*